(12) United States Patent
Volos et al.

(10) Patent No.: US 10,696,257 B2
(45) Date of Patent: Jun. 30, 2020

(54) AUTOMATIC CROWD SENSING AND REPORTING SYSTEM FOR ROAD INCIDENTS

(71) Applicant: DENSO International America, Inc., Southfield, MI (US)

(72) Inventors: Haris Volos, Sunnyvale, CA (US); Ravi Akella, San Jose, CA (US); Yunfei Xu, Milpitas, CA (US); Takashi Bando, Mountain View, CA (US)

(73) Assignee: DENSO International America, Inc., Southfield, MI (US)

( * ) Notice: Subject to any disclaimer, the term of this patent is extended or adjusted under 35 U.S.C. 154(b) by 211 days.

(21) Appl. No.: 16/037,437

(22) Filed: Jul. 17, 2018

(65) Prior Publication Data
US 2020/0023797 A1   Jan. 23, 2020

(51) Int. Cl.
*B60R 21/013* (2006.01)
*G07C 5/00* (2006.01)
*G06K 9/00* (2006.01)
*B60W 50/14* (2020.01)
*B60R 21/00* (2006.01)

(52) U.S. Cl.
CPC .......... *B60R 21/013* (2013.01); *B60W 50/14* (2013.01); *G06K 9/00805* (2013.01); *G06K 9/00845* (2013.01); *G07C 5/008* (2013.01); *B60R 2021/0027* (2013.01); *B60W 2050/143* (2013.01); *B60W 2540/22* (2013.01)

(58) Field of Classification Search
CPC .......... B60R 21/013; B60R 2021/0027; G07C 5/008; G06K 9/00805; G06K 9/00845; B60W 50/14; B60W 2540/22; B60W 2050/143
USPC .......................................................... 701/36
See application file for complete search history.

(56) References Cited

U.S. PATENT DOCUMENTS

| | | | |
|---|---|---|---|
| 7,289,019 B1 * | 10/2007 | Kertes | B60Q 9/008 340/435 |
| 7,348,895 B2 | 3/2008 | Lagassey | |
| 8,799,034 B1 | 8/2014 | Brandmaier et al. | |
| 9,491,420 B2 | 11/2016 | Mimar | |
| 10,032,318 B1 * | 7/2018 | Ferguson | B60R 1/00 |

(Continued)

*Primary Examiner* — Muhammad Shafi
(74) *Attorney, Agent, or Firm* — Harness, Dickey & Pierce, P.L.C.

(57) ABSTRACT

An automatic external incident detection and reporting system for a vehicle includes at least one of a plurality of cameras and a plurality of proximity sensors, an incident determination unit, a remote vehicle or object position determination unit, and a communication unit. The incident determination unit is configured to receive signals from the at least one of the cameras and proximity sensors, detect whether an external incident has occurred, and determine a type of incident. The remote vehicle or object position determination unit is configured to receive signals from the at least one of the cameras and proximity sensors and determine an incident location. The communication unit is configured to transmit at least the incident location and the type of incident to remote vehicles, to a local access point, or to share the incident location and the type of incident through a crowd-sourcing manner if the external incident has occurred.

20 Claims, 9 Drawing Sheets

(56) References Cited

U.S. PATENT DOCUMENTS

2009/0105902 A1* 4/2009 Choi ............... G08G 1/162
 701/33.4
2010/0253539 A1* 10/2010 Seder ............... G08G 1/0962
 340/903

* cited by examiner

AUTOMATIC CROWD SENSING AND REPORTING SYSTEM FOR ROAD INCIDENTS

FIELD

The present disclosure relates to automatic sensing by vehicles and, in particular, an automatic incident detection and reporting system.

BACKGROUND

This section provides background information related to the present disclosure which is not necessarily prior art.

Many vehicles currently employ cameras and/or proximity sensors used for the vehicle's own benefits. The cameras and/or proximity sensors provide information to the vehicle's control system regarding the events and environment surrounding the vehicle. The vehicle then may use this information in executing its own systems and functions, such as automatic emergency brake, forward collision warning, lane departure warning, lane change assist, etc.

SUMMARY

This section provides a general summary of the disclosure, and is not a comprehensive disclosure of its full scope or all of its features.

An example automatic incident detection and reporting system for a vehicle according to the present disclosure may include at least one of a plurality of cameras and a plurality of proximity sensors, an incident determination unit, a remote vehicle or object position determination unit, and a communication unit. The incident determination unit is configured to receive signals from the at least one of the plurality of cameras and the plurality of proximity sensors, detect whether an external incident has occurred, and determine a type of incident. The remote vehicle or object position determination unit is configured to receive signals from the at least one of the plurality of cameras and the plurality of proximity sensors and determine an incident location. The communication unit is configured to transmit at least the incident location and the type of incident to remote vehicles or a local access point, or to share the incident location and the type of incident through a crowd-sourcing manner if the external incident has occurred.

The incident determination unit may be configured to use facial recognition, hand signals, or body language to determine whether a driver is in distress.

The incident determination unit may be configured to analyze images from the plurality of cameras to determine whether there has been a traffic accident.

The incident determination unit may be configured to either compare images from the plurality of cameras with known images of large animals to determine whether there is large animal activity or use machine learning methods and models to automatically identify one or more animals.

The incident determination unit may be configured to either compare images from the plurality of cameras with known images of an acceptable roadway to determine whether there are potholes or debris on a roadway or use machine learning methods and models to automatically identify a road surface and any debris or damage to the road surface.

The external incident may be one of a vehicle accident, an immobilized vehicle, a broken-down vehicle, a pothole, large animal activity, an outlaw vehicle, a driver or other person in distress, significant damage to a road, debris, and one or more persons loitering, and the external incident may involve only one or more vehicles, persons, animals or objects outside of the vehicle.

The automatic incident detection and reporting system may further include a vehicle position determination unit that is configured to determine a current position of the vehicle.

The automatic incident detection and reporting system may further include a driver alert system that is configured to alert a driver when an incident is detected by the incident determination unit.

The communication unit may be configured to transmit the incident location and type of incident to a data transmission system on the vehicle, and the data transmission system may communicate the incident location and type of incident to a remote server.

The communication unit may be configured to transmit the incident location and type of incident to an emergency services provider.

An example method according to the present disclosure for automatically detecting and reporting external incidents includes receiving, by an incident determination unit and a remote vehicle or object position determination unit, a plurality of signals from at least one of a plurality of cameras and a plurality of proximity sensors disposed on a vehicle; detecting, by the incident determination unit, whether an external incident has occurred; determining, by the incident determination unit, a type of incident; determining, by the remote vehicle or object position determination unit, an incident location; and transmitting, by a communication unit, at least the incident location and the type of incident to remote vehicles or a local access point, or sharing, by the communication unit, the incident location and the type of incident through a crowd-sourcing manner if the external incident has occurred.

The method may further include performing, by the incident determination unit, facial recognition, hand-signal recognition, or body language recognition to determine whether a driver is in distress.

The method may further include analyzing, by the incident determination unit, images from the plurality of cameras to determine whether there has been a traffic accident.

The method may further include either comparing, by the incident determination unit, images from the plurality of cameras with known images of large animals to determine whether there is large animal activity, or employing, by the incident determination unit, detection algorithms to determine whether there is large animal activity.

The method may further include either comparing, by the incident determination unit, images from the plurality of cameras with known images of an acceptable roadway to determine whether there are potholes or debris on the roadway, or employing, by the incident determination unit, scene analysis algorithms to detect potholes or debris.

The method may further include an external incident that is one of a vehicle accident, an immobilized vehicle, a broken-down vehicle, a major pothole, large animal activity, an outlaw vehicle, a driver or other person in distress, significant damage to a road, and debris on the road, and the external incident involves only one or more vehicles, persons, or objects outside of the vehicle.

The method may further include determining, by a vehicle position determination unit, a current position of the vehicle.

The method may further include alerting, by a driver alert system, a driver when an incident is detected by the incident determination unit.

The method may further include transmitting, by the communication unit, the incident location and type of incident to a data transmission system on the vehicle, and communicating, by the data transmission system, the incident location and type of incident to a remote server.

The method may further include transmitting, by the communication unit, the incident location and type of incident to an emergency services provider.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Vehicles are often equipped with various sensors (for example, cameras, LiDAR, sonar, radar, microphones, etc.) to support safety and navigation features on the vehicle. The present disclosure uses these sensors to detect incidents outside of the vehicle (for example, incidents involving one or more remote vehicles, persons, etc.) and share the detected incidents to other drivers and the community. Such incidents may include accidents, immobilized vehicles, broken-down vehicles, major potholes, large animal activity near the road, outlaw (amber alert or silver alert) vehicle detection, drivers or people in distress (for example, using facial recognition, body posture, hand signals/gestures, etc.), significant damage or debris on the road/side of road, severe weather, etc. The system of the present disclosure automatically detects the various incidents and shares them in a crowd source manner (for example, utilizing fog nodes and cloud systems). Other vehicles, authorities, and service providers (for example, insurance companies) may then utilize the reported information. For example, the information may be used to dispatch help if needed. In some cases, the information may be stored and combined with other vehicles' data to build a complete story of time-stamped, specific events surrounding the incident. Furthermore, the information gathered may be used in automatic data analysis to determine which areas and at which times are more prone to accidents, more likely to see large animal activity, etc.

Figure 1:
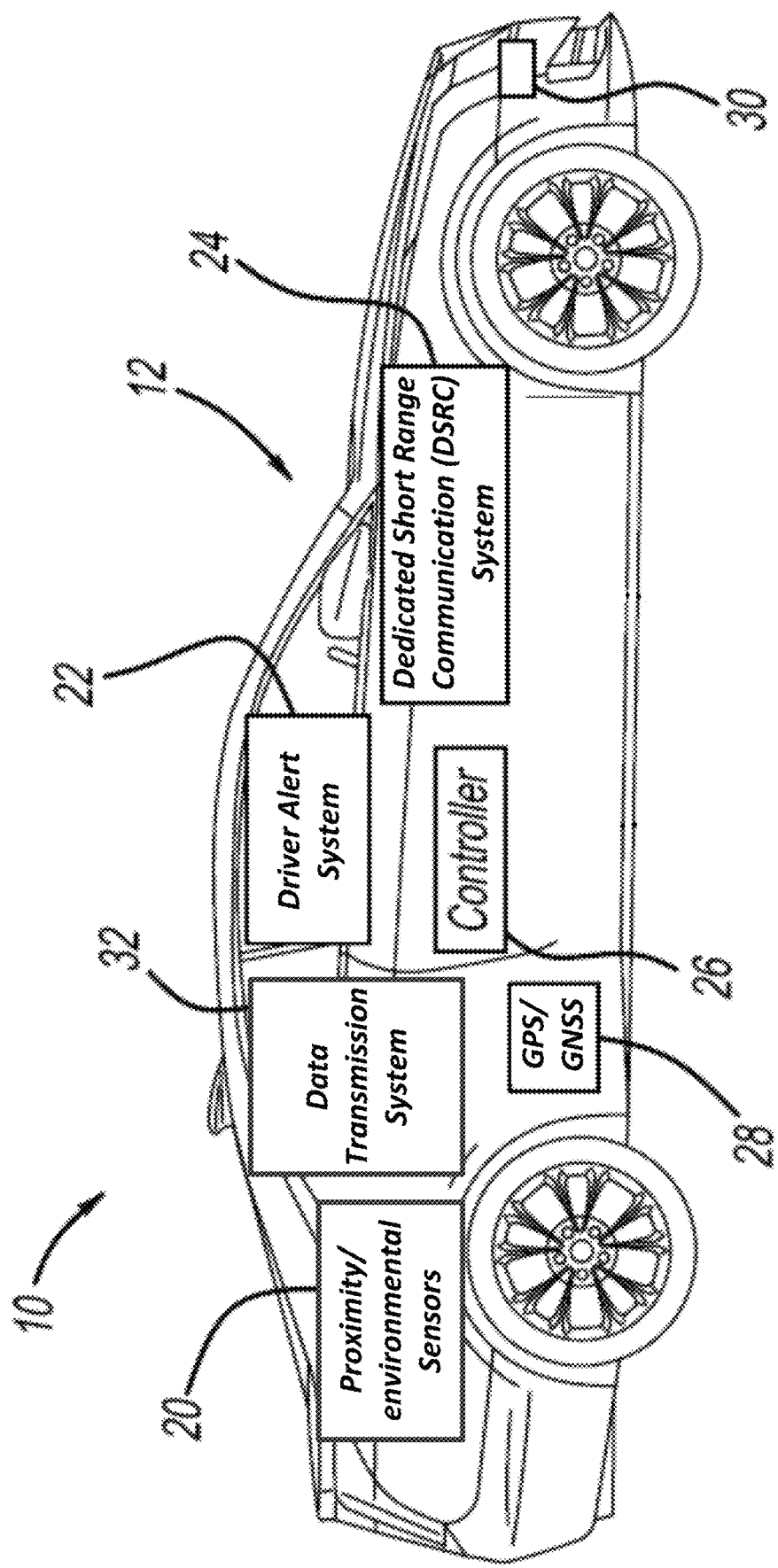
FIG. 1 illustrates a vehicle including an external incident detection and reporting system according to the present disclosure.

With reference to FIG. 1, a vehicle 10 including an automatic external incident detection and reporting system 12 according to the present teachings is illustrated. Although the vehicle 10 is illustrated as an automobile in FIG. 1, the present teachings apply to any other suitable vehicle, such as a sport utility vehicle (SUV), a mass transit vehicle (such as a bus), or a military vehicle, as examples. Additionally, the system 12 may be incorporated in any stationary structure or moving structure as well. The system 12 is configured to automatically detect various incidents (for example only, accidents, immobilized vehicles, broken-down vehicles, major potholes, large animal activity near the road, amber alert or silver alert vehicle detection, drivers or people in distress, significant damage or debris on the road/side of road, severe weather, etc.) and share them in a crowd source manner (for example, utilizing cloud systems). The system 12 may generally include one or more proximity and/or environmental sensors 20, a driver alert system 22, a dedicated short range communication (DSRC) system 24, a controller 26, a global positioning system (GPS) or global navigation satellite system (GNSS) 28, one or more cameras 30, and a data transmission system 32. While a DSRC system 24 is described herein, it is understood that the system 12 is not limited to utilizing a DSRC system 24. For example, the DSRC system 24 may be any V2X communication protocol or any cellular protocol.

The controller 26 can be any suitable controller for monitoring and/or controlling one or more of the proximity and/or environmental sensors 20, the driver alert system 22, the DSRC system 24, the GPS/GNSS 28, one or more of the cameras 30, the data transmission system 32 and/or the additional vehicle systems, sensors, and functions. In this application, including the definitions below, the terms "controller" and "system" may refer to, be part of, or include processor hardware (shared, dedicated, or group) that executes code and memory hardware (shared, dedicated, or group) that stores code executed by the processor hardware. The code is configured to provide the features of the controller and systems described herein.

The proximity sensors 20 include one or more sensors configured to identify and/or detect the presence of objects, such as pedestrians, cyclists, or other vehicles, in one or more areas around the subject vehicle 10. The proximity sensors 20 can include any suitable sensors, such as any suitable radar, sonar, laser, camera, ultrasonic, LiDAR, stereo, or other suitable sensors for detecting objects in an area around the subject vehicle 10. The environmental sensors 20 can include sensors to determine light level, weather data, temperature, road surface status, traffic conditions, lane markers, etc. The proximity and/or environmental sensors 20 can be mounted at any suitable position on the subject vehicle 10, such as in the front of the subject vehicle 10, rear of the subject vehicle 10, near the front corners of the subject vehicle 10, near the back corners of the subject vehicle 10, or along the sides of the subject vehicle 10.

The one or more cameras 30 include one or more cameras configured to identify and/or detect the presence of objects, such as pedestrians, cyclists, or other vehicles, in one or more areas around the subject vehicle 10. The cameras 30 may also be used to record and/or detect the various incidents outside of and around the vehicle (for example, incidents involving one or more remote vehicles, persons, etc.). Such incidents may include accidents, immobilized vehicles, broken-down vehicles, major potholes, large animal activity near the road, outlaw (amber alert or silver alert) vehicle detection, drivers or people in distress (for example, using facial recognition, body posture, hand signals/gestures, etc.), significant damage or debris on the road/side of road, sever weather, etc. The cameras 30 can include any suitable camera for detecting objects or incidents in an area around the subject vehicle 10 (for example only, audio, video, LiDAR, radar, sonar etc.). The cameras 30 can be mounted at any suitable position on the subject vehicle 10, such as in the front of the subject vehicle 10, rear of the subject vehicle 10, near the front corners of the subject vehicle 10, near the back corners of the subject vehicle 10, or along the sides of the subject vehicle 10.

Figure 2:
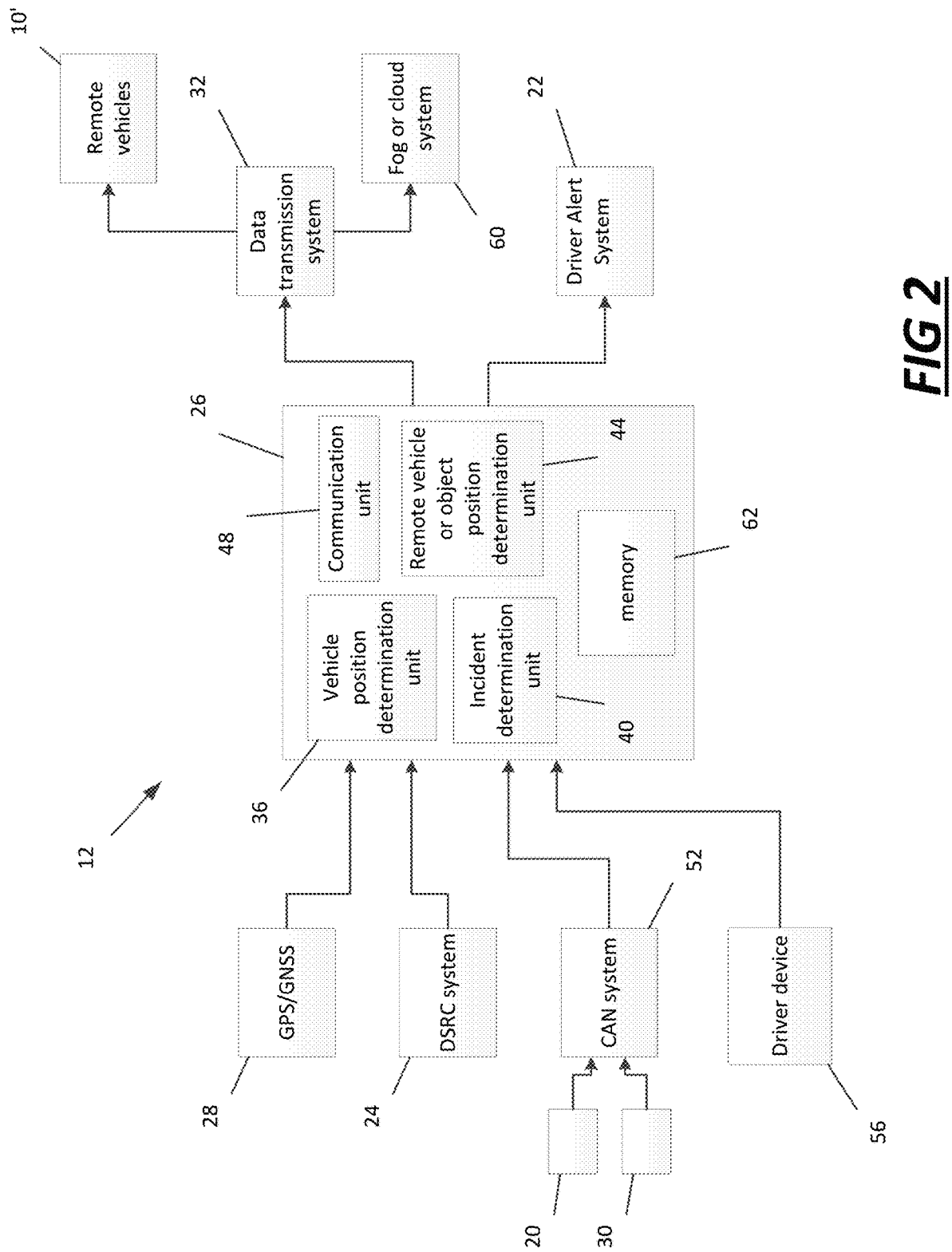
FIG. 2 is a schematic view of the external incident detection and reporting system of FIG. 1.
Figure 3:
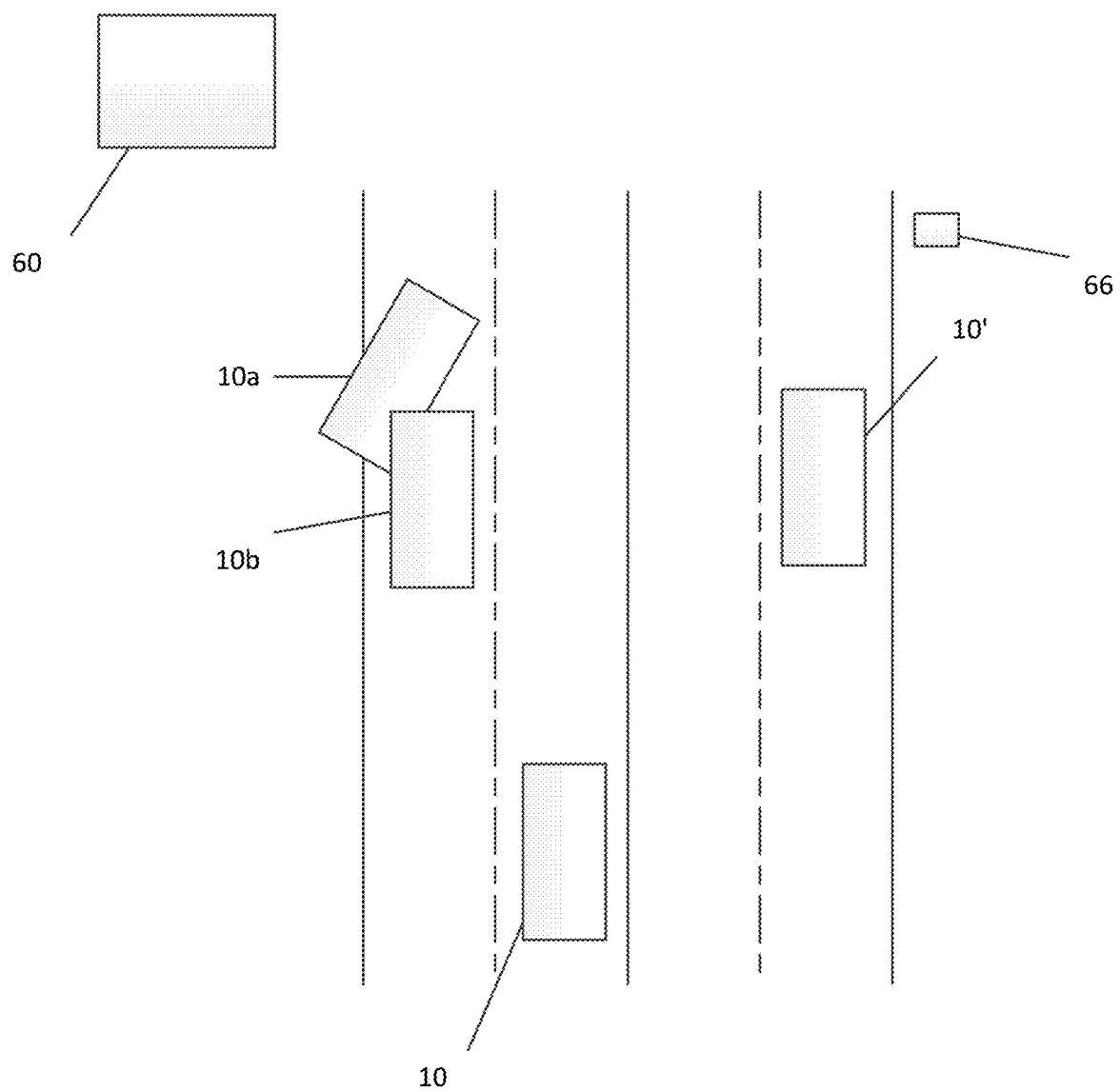
FIG. 3 is an illustration of several vehicles, where two vehicles are involved in an accident and at least one vehicle includes the external incident detection and reporting system of FIG. 1.
Figure 4:
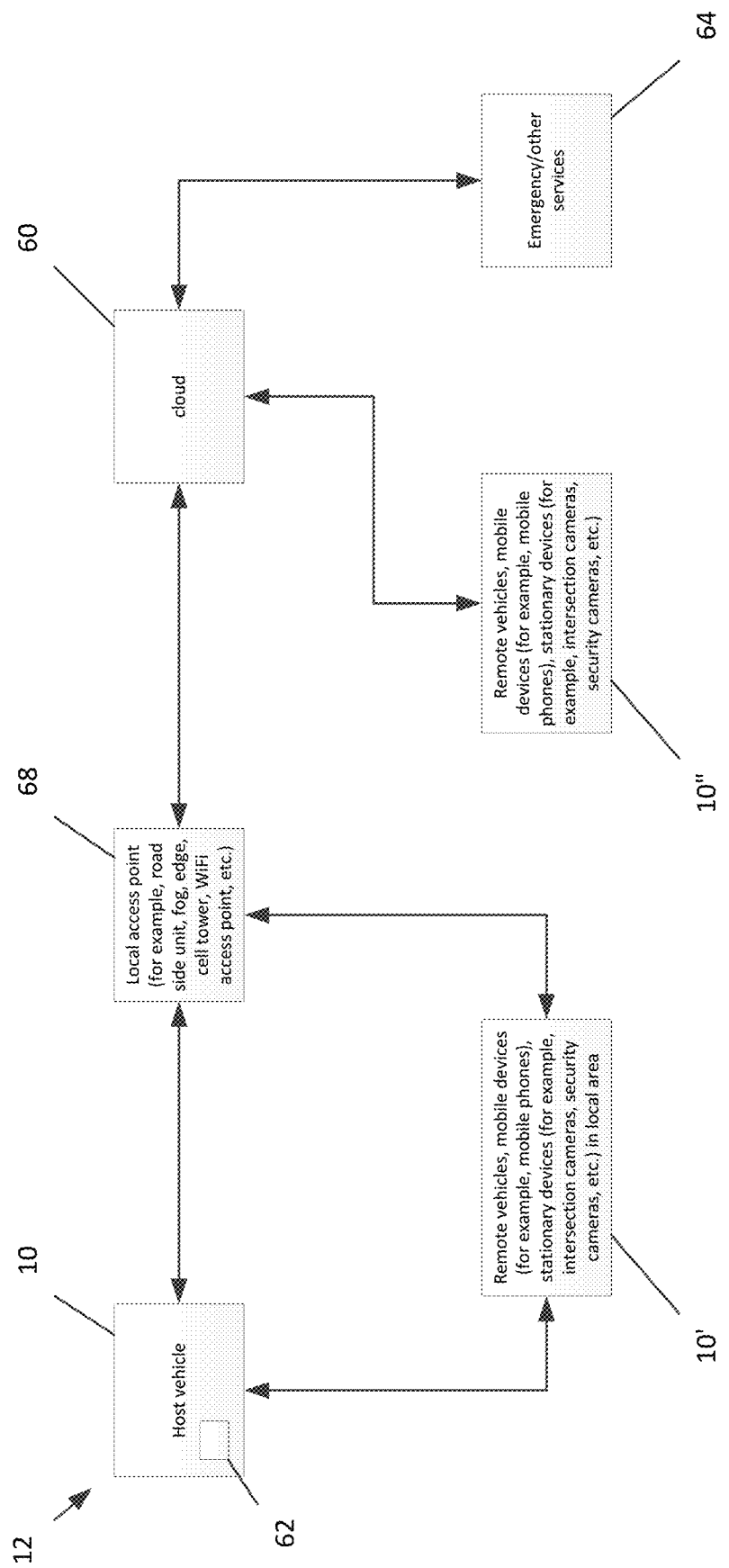
FIG. 4 is a schematic view of the external incident detection and reporting system of FIG. 1 interacting with external vehicle and non-vehicle systems.

Now referring to FIGS. 2-4, the system 12 is configured to automatically detect various incidents (for example only, accidents, immobilized vehicles, broken-down vehicles, major potholes, large animal activity near the road, amber alert or silver alert vehicle detection, drivers or people in distress, significant damage or debris on the road/side of road, severe weather, etc.) and share them in a crowd source manner (for example, utilizing fog nodes or cloud systems).

The controller 26 may include a vehicle position determination unit 36, an incident determination unit 40, a remote vehicle or object position determination unit 44, and a communication unit 48. The vehicle position determination unit 36 may communicate with, and receive signals from, the GPS and/or GNSS 28 and/or the proximity and/or environmental sensors 20 and cameras 30 to determine a location of the vehicle 10. The proximity and/or environmental sensors 20 and cameras 30 may communicate with the vehicle position determination unit 36 through a Controller Area Network (CAN) system 52 or any other in-vehicle communication network.

The incident determination unit 40 may receive signals from the proximity and/or environmental sensors 20 and cameras 30. The incident determination unit 40 may use the proximity and/or environmental sensors 20 and cameras 30 to determine whether an incident has occurred outside of and around the vehicle (for example, incidents involving one or more remote vehicles, persons, etc.). The incident determination unit 40 may also determine a location and a type of external incident from the data transmitted from the proximity and/or environmental sensors 20 and cameras 30. Such incidents may include accidents, immobilized vehicles, broken-down vehicles, major potholes, large animal activity near the road, outlaw (amber alert or silver alert) vehicle detection, drivers or people in distress (for example, using facial recognition, body posture, hand signals/gestures, etc.), significant damage or debris on the road/side of road, severe weather, etc.

For example, the incident determination unit 40 may determine that an accident has occurred by analyzing images from the cameras 30 to detect remote vehicle damage, remote vehicle status (such as whether driving, position of the vehicle relative to the road, location of the vehicle, etc.), status of driver (such as whether the driver is in the vehicle, out of the vehicle, alert, etc.), etc. In addition to the cameras 30, or in the alternative, the incident determination unit 40 may utilize the proximity and/or environmental sensors 20 to determine the information.

For example, the incident determination unit 40 may determine that an immobilized vehicle or broken-down vehicle is present by analyzing images from the cameras 30 to detect remote vehicle status (such as whether driving, position of the vehicle relative to the road, location of the vehicle, etc.), status of driver (such as whether the driver is in the vehicle, out of the vehicle, alert, etc.), etc. In addition to the cameras 30, or in the alternative, the incident determination unit 40 may utilize the proximity and/or environmental sensors 20 to determine the information.

For example, in some embodiments, the incident determination unit 40 may determine the occurrence of extreme road conditions, including major potholes, significant damage, or debris on the road/side of road, by analyzing images from the cameras 30 to detect features of the road or objects on the road that are unexpected. For example, the incident determination unit 40 may compare the images from the cameras 30 with images of known objects that may be on the road (for example road cones, barrels, signs, construction equipment, etc.). If the images from the cameras 30 do not match any of the images of known objects, then the incident determination unit 40 may determine that there is an occurrence of potholes, significant damage, or debris on the road/side of road. In addition to the cameras 30, or in the alternative, the incident determination unit 40 may utilize the proximity and/or environmental sensors 20 to determine the information.

Further, in some example embodiments, the incident determination unit 40 may detect the extreme road conditions by utilizing machine learning methods and models to automatically identify a road surface and any debris or damage to the road surface. For example, the incident determination unit 40 may use background detection and subtraction techniques to extract the foreground objects such as an adaptive Kalman filter that tracks objects from frame to frame, kernel density methods, mixture of gaussians, principal component analysis, and deep learning methods. Once the background is separated from the foreground objects, the objects are recognized using image recognition methods such as deep learning. The same is done for the background in order to identify certain features: quality and type of pavement, soil, vegetation, and other objects near and around the road/ground.

For example, the incident determination unit 40 may determine sever weather conditions or localized storms (i.e., monsoons, hail, tornadoes, etc.) by analyzing images from the cameras 30 to detect features of the current weather that match known images from different types of storms. For example, the incident determination unit 40 may compare the images from the cameras 30 with images of hail, tornado funnels, or monsoons. If the images from the cameras 30 match any of the known or stored images, then the incident determination unit 40 may identify extreme weather or localized storms. In addition to the cameras 30, or in the alternative, the incident determination unit 40 may utilize the proximity and/or environmental sensors 20 to determine the information.

For example, in some embodiments, the incident determination unit 40 may determine the occurrence of large animal activity near the road by analyzing images from the cameras 30 to detect large animals. For example, the incident determination unit 40 may compare the images from the cameras 30 with images of known animals that may be on the road (for example deer, moose, cow, horse, pig, dog, etc.). If the images from the cameras 30 match any of the images of known objects, then the incident determination unit 40 may determine that there is an occurrence of large animal activity near or on the road. In addition to the cameras 30, or in the alternative, the incident determination unit 40 may utilize the proximity and/or environmental sensors 20 to determine the information.

Further, in some example embodiments, the incident determination unit 40 may determine the occurrence of large animal activity near the road by utilizing machine learning methods and models to automatically identify one or more animals. For example, the incident determination unit 40 may use background detection and subtraction techniques to extract the foreground objects such as an adaptive Kalman filter that tracks objects from frame to frame, kernel density methods, mixture of gaussians, principal component analysis, and deep learning methods. Once the background is separated from the foreground objects, the objects are recognized using image recognition methods such as deep learning. The same is done for the background in order to identify certain features: quantity and types of animals or other objects near and around the road/ground.

For example, the incident determination unit 40 may detect outlaw (for example, amber alert, silver alert, or otherwise wanted) vehicles by analyzing images from the cameras 30 to detect remote vehicles. For example, the incident determination unit 40 may compare the images from the cameras 30 with a database of vehicle information (for example, make, model, and color of vehicle or license plate number). The database of vehicle information may be communicated to the system 12, and incident determination unit 40, from a government alert sent to the vehicle 10, either through wireless, Bluetooth, cloud, fog nodes, or other communications. If the images from the cameras 30 include vehicles that match any of the entries in the database, then the incident determination unit 40 may determine that an outlaw vehicle has been detected. In addition to the cameras 30, or in the alternative, the incident determination unit 40 may utilize the proximity and/or environmental sensors 20 to determine the information.

For example, the incident determination unit 40 may detect drivers or people in distress by analyzing images from the cameras 30 to detect people. For example, the incident determination unit 40 may compare the images from the cameras 30 with images of known facial characteristics indicating distress (for example, furrowed eyebrows, tears, scowl, yelling, etc.) using facial recognition. The incident determination unit 40 may further compare the images from the cameras 30 with images of known body posture characteristics (for example, both arms in air, kneeled by vehicle, etc.) indicating distress or hand signals (i.e., body language recognition) or gestures (crossing arms above head, waving, thumbs up, etc.) indicating distress (i.e., hand-signal recognition). If the images from the cameras 30 match any of the characteristics, hand signals, or gestures of distress, then the incident determination unit 40 may determine that one or more people in distress are present.

In addition to the proximity and/or environmental sensors 20 and cameras 30, the incident determination unit 40 may communicate with the DSRC system 24 (or any other V2X communication or cellular protocol) to determine remote vehicle and/or infrastructure information. For example, the DSRC system 24 (or any other V2X communication or cellular protocol) may communicate with a remote vehicle to determine whether an accident has occurred or whether there is an immobilized vehicle or broken-down vehicle in the vicinity. For example, the remote vehicle involved in the accident or that is immobilized or broken-down may communicate its status to the vehicles DSRC system 24 (or any other V2X communication or cellular protocol).

In addition, or alternatively, the incident determination unit 40 may communicate with a driver's or passenger's device 56 either wirelessly or through wired or Bluetooth communications. The driver's or passenger's device 56 may include a mobile phone, a tablet, a laptop computer, or another electronic device. The driver's or passenger's device 56 may transmit camera images or remote vehicle data to the incident determination unit 40 for use similar to the proximity and/or environmental sensors 20, cameras 30, and DSRC system 24.

The remote vehicle or object position determination unit 44 may determine GPS and/or GNSS position coordinates, or other location data, for the remote vehicle or person in distress. For example, the remote vehicle or object position determination unit 44 may receive data from the proximity and/or environmental sensors 20, cameras 30, and DSRC system 24 and use the images, sensor data, or messages to determine one or more of GPS and/or GNSS position coordinates, street location, mile marker location, etc., of the remote vehicles or person in distress.

The communication unit 48 may receive data from the vehicle position determination unit 36, the incident determination unit 40, and the remote vehicle or object position determination unit 44 and communicate it to the data transmission system 32 or the driver alert system 22. For example, if there is a detected incident outside of and around the vehicle (for example, incidents involving one or more remote vehicles, persons, etc.), the communication unit 48 may receive data indicating a position or location of the vehicle 10 from the vehicle position determination unit 36, the detected incident from the incident determination unit 40, and a location or position of the remote vehicle/incident/person from the remote vehicle or object position determination unit 44.

The driver alert system 22 may receive commands from the controller 26 to alert the driver. The driver alert system 22 may alert the driver by any means available, including but not limited to a driver information center (DIC) display, a heads-up display, an alarm, a radio, a steering while (for example with vibration), or a driver seat (for example with vibration).

The data transmission system 32 may receive commands from the controller 26 to distribute data to remote vehicle, mobile device, or stationary device 10' or remote server, cloud server, or fog node 60. The cloud/fog system 60 may then distribute the information to one or more remote vehicles, mobile devices (for example, mobile phones, navigation systems, etc.), or stationary devices (for example only, intersection cameras, security cameras, etc.) 10" not in the local area (as opposed to vehicles, mobile devices, or stationary devices 10') and/or emergency or other services 64 (FIG. 4). The emergency or other services 64 may include police, fire, ambulance, etc., emergency services, insurance services, doctor or other medical non-emergency services, game wardens, park rangers, non-emergency law enforcement services, etc.

The data transmission system 32 may transmit information such as the position or location of the vehicle 10, the detected incident, and the location or position of the remote vehicle/incident/person. Additional information that may either be transmitted or saved for future transmission may be photos of videos of the incident/vehicle/person for use by emergency or other services.

In some examples, the controller 26 may include a memory 62 or other electronic storage to temporarily store or cache the incident information for later distribution. Examples of information that may be stored include, but are not limited to, snapshots or images of the incidents or accidents, videos of the incidents or accidents, incident location information, incident time information, weather metrics, details and statistics of large animal activities, a list of providers, services, or agencies (for example, emergency services—911, roadside assistance, operator assistance, animal control, animal studies, research institutions, insurance companies, weather service, roadwork services, or other providers).

An example vehicle accident scenario is illustrated in FIG. 3. In the depicted example, vehicles 10a and 10b are involved in a traffic incident, in particular, a vehicle accident. In this scenario, the system 12 of the vehicle 10 would record data through the vehicle's camera(s) 30 and proximity or environmental sensors 20 (along with timestamp and GPS location). Data that may be recorded includes, but is not limited to, snapshots or images of the incidents or accidents, videos of the incidents or accidents, incident location information, incident time information, weather metrics, details and statistics of large animal activities. The system 12 in the vehicle 10 may send the incident information immediately to emergency services through the communication unit 48, data transmission system 32, and cloud 60, as previously discussed, or the system 12 may store the data for later query in the memory 62. Additionally, remote vehicles, mobile devices, or stationary devices 10' or road infrastructure 66 may record image or video clips of the accident along with timestamp and GPS information which can be combined with the incident information collected by the system 12 to reconstruct the scene to assist police reporting and/or insurance companies in determining facts and fault.

Now referring to FIG. 4, the system 12 of the host vehicle 10 uses the various sensors 20 and cameras 30 to detect incidents outside of the vehicle (for example, incidents involving one or more remote vehicles, persons, etc.) and share information related to the detected incidents to other drivers and the community, either through local sharing (for example, DSRC, V2X communications, cellular communications, etc.) with remote vehicles, mobile devices, or stationary devices 10' in the local area or remote vehicles, mobile devices, or stationary devices 10" and services through a crowd sourcing manner (for example, utilizing fog nodes or cloud systems). Such incidents, as previously stated, may include accidents, immobilized vehicles, broken-down vehicles, major potholes, large animal activity near the road, outlaw (amber alert or silver alert) vehicle detection, drivers or people in distress (for example, using facial recognition, body posture, hand signals/gestures, etc.), significant damage or debris on the road/side of road, etc. Examples of information that may be shared include, but are not limited to, snapshots or images of the incidents or accidents, videos of the incidents or accidents, incident location information, incident time information, weather metrics, details and statistics of large animal activities, a list of providers, services, or agencies (for example, emergency services—911, roadside assistance, operator assistance, animal control, animal studies, research institutions, insurance companies, weather service, roadwork services, or other providers).

The other vehicles, mobile devices, or stationary devices 10', 10", authorities 64, and service providers (for example, emergency services—911, roadside assistance, operator assistance, animal control, animal studies, research institutions, insurance companies, weather service, roadwork services, or other providers) 64 may then utilize the reported information. For example, the information may be used to dispatch help if needed. In some cases, the information may be stored and combined with other vehicles', mobile devices', or stationary devices' 10' data to build a complete story of time-stamped, specific events surrounding the incident (for example, the cloud 60 may stitch individual videos uploaded by various vehicles 10, 10', 10", portable devices such as cell phones, navigation systems, etc., and/or stationary devices such as cameras mounted on structures or traffic lights, etc.). Furthermore, the information gathered may be used in automatic data analysis to determine which areas and at which times are more prone to accidents, more likely to see large animal activity, etc.

As illustrated in FIG. 4, the host vehicle 10 may include the memory 62 or other electronic storage to temporarily store or cache the incident information (for example, snapshots or images of the incident, videos of the incident, incident location information, incident time information, weather metrics, details and statistics of large animal activities, etc.) for later distribution.

The host vehicle 10 may transmit the data through wireless, Bluetooth, DSRC, or other communications to remote vehicles, mobile devices, or stationary devices 10' in the local area or to a local access point 68. The local access point 68 may be a transceiver in a wireless local area network (WLAN) or a wireless access point (WAP). For example, the local access point 68 may be a road side unit, a fog node, an edge, a cell tower, a wireless access (Wi-Fi access point), etc. The local access point 68 may receive the data from the host vehicle 10, store the data, and transmit it to other users within the network (for example remote vehicles, mobile devices, or stationary devices 10') or other access points. For example, the local access point 68 may be used for temporary storage or cache of the incident information. The local access point 68 may also be used for long term (for example 6 months) storage of local statistics (for example, weather and large animal activity).

The local access point 68 may also transmit the incident information data to the cloud server 60 or fog node. The cloud server may be a logical server that is built, hosted, and delivered through a cloud computing platform over the internet. Cloud servers may possess and exhibit similar capabilities and functionality to a physical hardware server but are accessed remotely in a shared "virtualized" environment from a cloud service provider. Fog computing may act as a "mini-cloud," located at the edge of the network and implemented through a variety of edge devices, interconnected by a variety, mostly wireless, communication technologies. Thus, a fog node may be the infrastructure implementing the said mini-cloud. For example, the fog node in the present example may be the local access point 68 that transmits data from the system 12 to the cloud 60.

The incident information data may be stored in the cloud 60 or fog node long-term (for example, forever or until decided as not needed by a data retention policy). In addition to storage, the cloud 60 may calculate trends and statistics from the stored data (for example weather and large animal activity trends or accident occurrence statistics for a location).

Remote vehicles, mobile devices, or stationary devices 10" may pull the data or information from the cloud 60, for example, to prepare traffic routes, avoid back-ups or collisions, or for safety. Additionally, the historical analysis of the data in the cloud 60 may be used to create warnings at higher incident times of the day which can be sent to vehicles in the area. Emergency and other services 64 may also pull the data from the cloud 60, for example, to dispatch emergency vehicles or game wardens/park rangers, for insurance purposes, for accident reports, etc.

Figure 5:
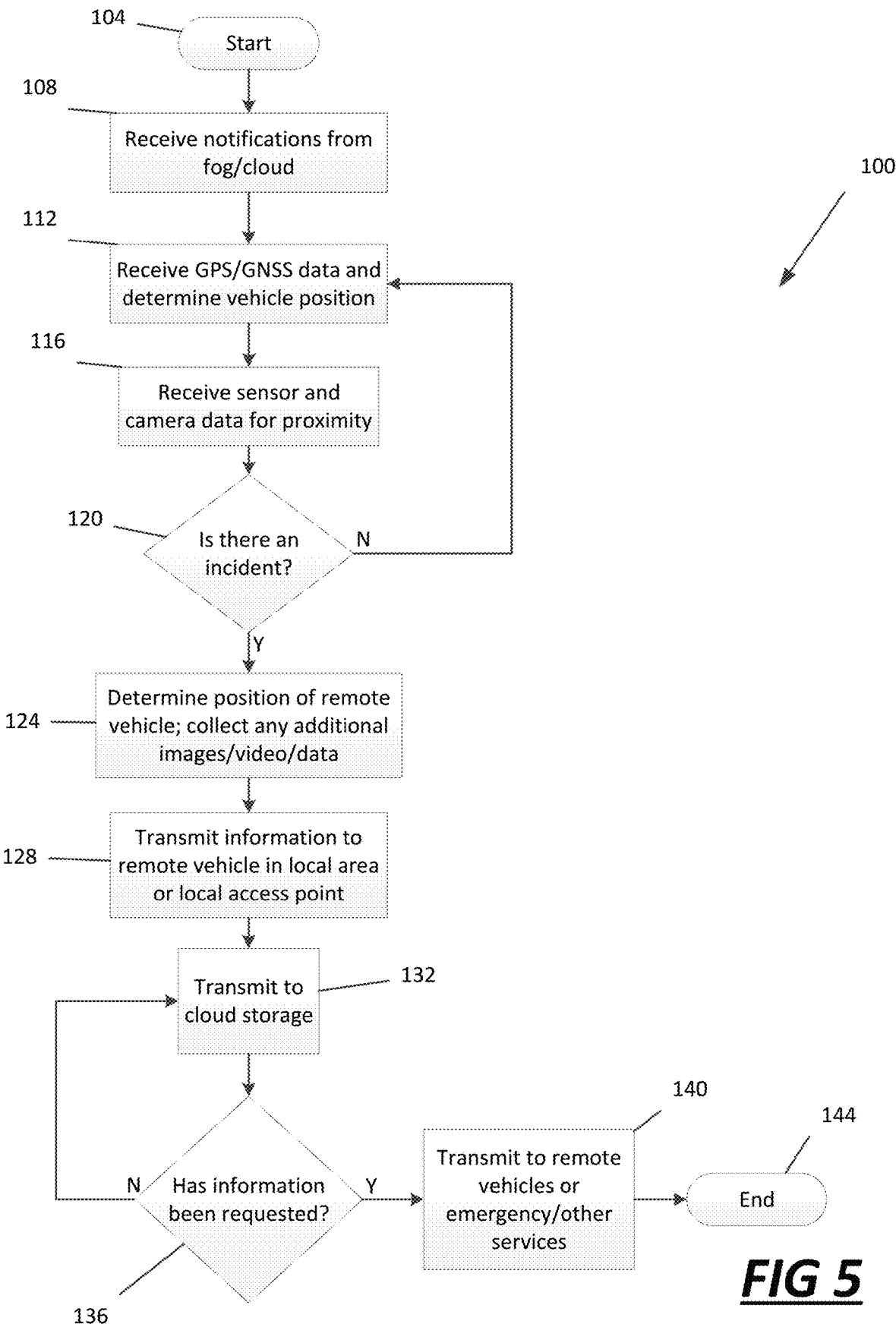
FIG. 5 is a flow chart illustrating an example method of detecting and reporting external incidents according to the present disclosure.

Now referring to FIG. 5, an example method 100 of detecting and reporting external incidents from a vehicle according to the present disclosure is illustrated. The method 100 starts at 104. At 108, the method 100 receives notifications from the fog/cloud 60 system. For example, the notifications may include amber alerts, silver alerts, or other outlaw vehicle alerts sent by a government organization or the police. For example, the police or other government organization may store databases of amber alerts, silver alerts, outlaw vehicle alerts, regional information, announcements from authorities, and other alerts in the cloud or remote server 60. The information may be sent to the system 12 (for example through wireless, Bluetooth, or other communications) from the cloud 60 through fog nodes or the local access point 68 and stored in the memory 62.

At 112, the method 100 receives GPS and/or GNSS data and determines vehicle position. Specifically, the vehicle position determination unit 36, previously discussed, may communicate with, and receive signals from, the GPS and/or GNSS 28 and/or the proximity and/or environmental sensors 20 and cameras 30 to determine a location of the vehicle 10. The proximity and/or environmental sensors 20 and cameras 30 may communicate with the vehicle position determination unit 36 through a Controller Area Network (CAN) system 52.

At 116, the method 100 receives data from the proximity and/or environmental sensors 20, the cameras 30, and the DSRC system 24. Specifically, the incident determination unit 40, previously discussed, may receive signals from the proximity and/or environmental sensors 20 and cameras 30 which indicate information regarding the vehicles, structures, and environment surrounding the vehicle 10. In addition, or alternatively, the incident determination unit 40 may communicate with a driver's or passenger's device 56 either wirelessly or through wired or Bluetooth communications. The driver's or passenger's device 56 may include a mobile phone, a tablet, a laptop computer, or another electronic device. The driver's or passenger's device 56 may transmit camera images or remote vehicle data to the incident determination unit 40 for use similar to the proximity and/or environmental sensors 20, cameras 30, and DSRC system 24.

At 120, the method 100 determines whether there have been any incidents in the vehicle's proximity. For example, the incident determination unit 40 may use the proximity and/or environmental sensors 20, cameras 30, DSRC system 24 communications, and/or driver's or passenger's device 56 to determine whether an incident has occurred outside of and around the vehicle (for example, incidents involving one or more remote vehicles, persons, etc.). Such incidents may include accidents, immobilized vehicles, broken-down vehicles, major potholes, large animal activity near the road, outlaw (amber alert or silver alert) vehicle detection, drivers or people in distress (for example, using facial recognition, body posture, hand signals/gestures, etc.), significant damage or debris on the road/side of road, etc.

If there has not been an incident at 120, method 100 returns to 112. If an incident was detected at 120, the method determines the position of the remote vehicle involved in the incident at 124. Specifically, the remote vehicle positon or object determination unit 44 may determine GPS and/or GNSS position coordinates, or other location data, for the remote vehicle or person in distress. For example, the remote vehicle or object position determination unit 44 may receive data from the proximity and/or environmental sensors 20, cameras 30, and DSRC system 24 and use the images, sensor data, or messages to determine one or more of GPS and/or GNSS position coordinates, street location, mile marker location, etc., of the remote vehicles or person in distress. Additionally, any further images, video, and data may be collected from the cameras 30 and/or sensors 20.

At 128, the method 100 transmits the incident information to remote vehicles or access points in the local area. Specifically, the communication unit 48, as previously described, may transmit the data through wireless, Bluetooth, DSRC, or other communications to remote vehicle, mobile device, or stationary device 10' in the local area or to a local access point 68. The local access point 68 may be a transceiver in a wireless local area network (WLAN) or a wireless access point (WAP). For example, the local access point 68 may be a road side unit, a fog node, an edge, a cell tower, a wireless access (Wi-Fi_33 access point), etc. The local access point 68 may receive the data from the host vehicle 10 and transmit it to other users within the network (for example remote vehicles, mobile devices, or stationary devices 10') or other access points.

At 132, the local access point 68 may transmit the data to the cloud (i.e., a remote server) 60 or fog node. The cloud server may be a logical server that is built, hosted, and delivered through a cloud computing platform over the internet. Cloud servers may possess and exhibit similar capabilities and functionality to a physical hardware server but are accessed remotely in a shared "virtualized" environment from a cloud service provider. Fog computing may act as a "mini-cloud," located at the edge of the network and implemented through a variety of edge devices, interconnected by a variety, mostly wireless, communication technologies. Thus, a fog node may be the infrastructure implementing the said mini-cloud. For example, the fog node in the present example may be the local access point 68 that transmits data from the system 12 to the cloud 60.

At 136, method 100 determines whether information has been requested by remote vehicles or services. If the information has not been requested, method 100 returns to 132. If the incident information has been requested, the incident information is transmitted to the remote vehicles, mobile devices, or stationary devices 10'', emergency service providers, or other service providers at 140. Specifically, remote vehicles, mobile devices, or stationary devices 10'' and services may receive the information on the detected incidents, either through local sharing (DSRC, etc.) or through a crowd sourcing manner (for example, utilizing cloud systems). The other vehicles, mobile devices, or stationary devices 10'', authorities 64, and service providers (for example, insurance companies) 64 may then utilize the reported information. For example, the information may be used to dispatch help if needed. In some cases, the information may be stored and combined with other vehicles', mobile devices', or stationary devices' 10' data to build a complete story of time-stamped, specific events surrounding the incident. Furthermore, the information gathered may be used in automatic data analysis to determine which areas and at which times are more prone to accidents, more likely to see large animal activity, etc.

The method ends at 144.

Figure 6:
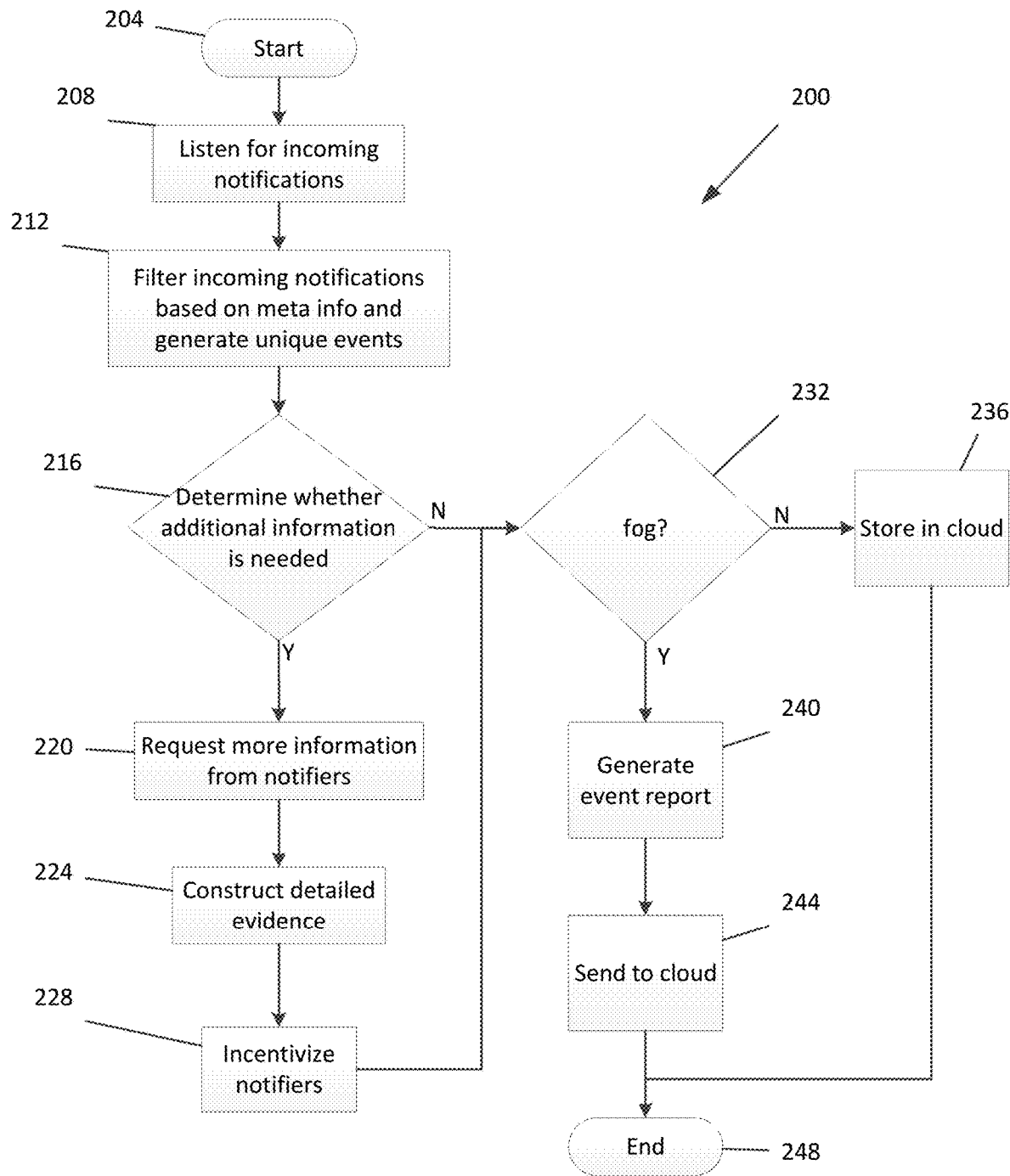
FIG. 6 is a flow chart illustrating an example method of receiving and reporting external incidents at a fog node or cloud according to the present disclosure.

Now referring to FIG. 6, an example method 200 of receiving and reporting external incidents at a fog node or cloud according to the present disclosure is illustrated. Method 200 begins at 204. At 208, the method 200 listens for incoming notifications. Specifically, the cloud/fog system 60 monitors wireless, Bluetooth, or other communications networks for incoming notifications.

At 212, the incoming notifications received by the cloud/fog system 60 are filtered based on metadata and compiled into unique events. For example, the cloud/fog system 60 would analyze the metadata (i.e., timestamp, location, description, snapshot, etc.) from each of the incoming notifications to group them into separate events.

At 216, the method 200 determines whether additional information is needed for each of the events. For example, the cloud/fog system 60 analyzes the notifications received in each of the separate events and determines whether there are notifications for a predetermined list of information. The predetermined list of information may be different for different types of events. An example list for a traffic accident may include images of vehicles involved, images of license plates, images of accident, images of drivers, images of passengers, video of accident, weather data, time data, location data, road condition data, etc.

If additional information is needed at 216, method 200 requests more information from notifiers at 220. For example, the incoming notifications received in step 208 may include notifier information in the metadata. The cloud/fog system 60 may extract the notifier information and contact the notifier requesting additional information. The additional information requested may be specific, such as a specific image or data file, or the requested information may be a generic request.

At 224, the method 200 collects and analyzes the additional information. For example, the cloud/fog system 60 collects and filters the additional information similar to steps 208 and 212. At 228, the notifiers who responded providing information are incentivized. For example, the notifiers could receive credits that may be turned in for discounts or gift cards, or the notifiers may be awarded in another manner. The method 200 then moves to step 232.

If additional information was not needed at 216, method 200 determines whether the system is operating in the fog node at 232 (i.e., as opposed to a cloud mode). As previously stated, fog computing may act as a "mini-cloud," located at the edge of the network and implemented through a variety of edge devices, interconnected by a variety, mostly wireless, communication technologies. Fog computing may be faster and more efficient than cloud computing because fog computing brings the cloud service closer to "things" such as sensors, embedded systems, mobile phones, cars, etc. The fog node may be the specific edge device that is implementing the "mini-cloud."

If not operating in the fog node, method 200 stores the incident information in the cloud 60 at 236. If operating in the fog node at 232, the method generates an event report at 240. The event report may include all of the data collected in relation to the categorized event and packaged for storage or transmission to a service or emergency provider.

At 244, the event report is sent to the cloud 60 for storage. The cloud 60 may be utilized for long-term storage (for example, indefinitely or until a data retention policy ends). Service or other approved providers may be able to access the event report from the cloud 60. For example, insurance providers may access the event report for accident reconstruction, determination of fault, or fact-finding.

The method 200 ends at 248.

Figure 7:
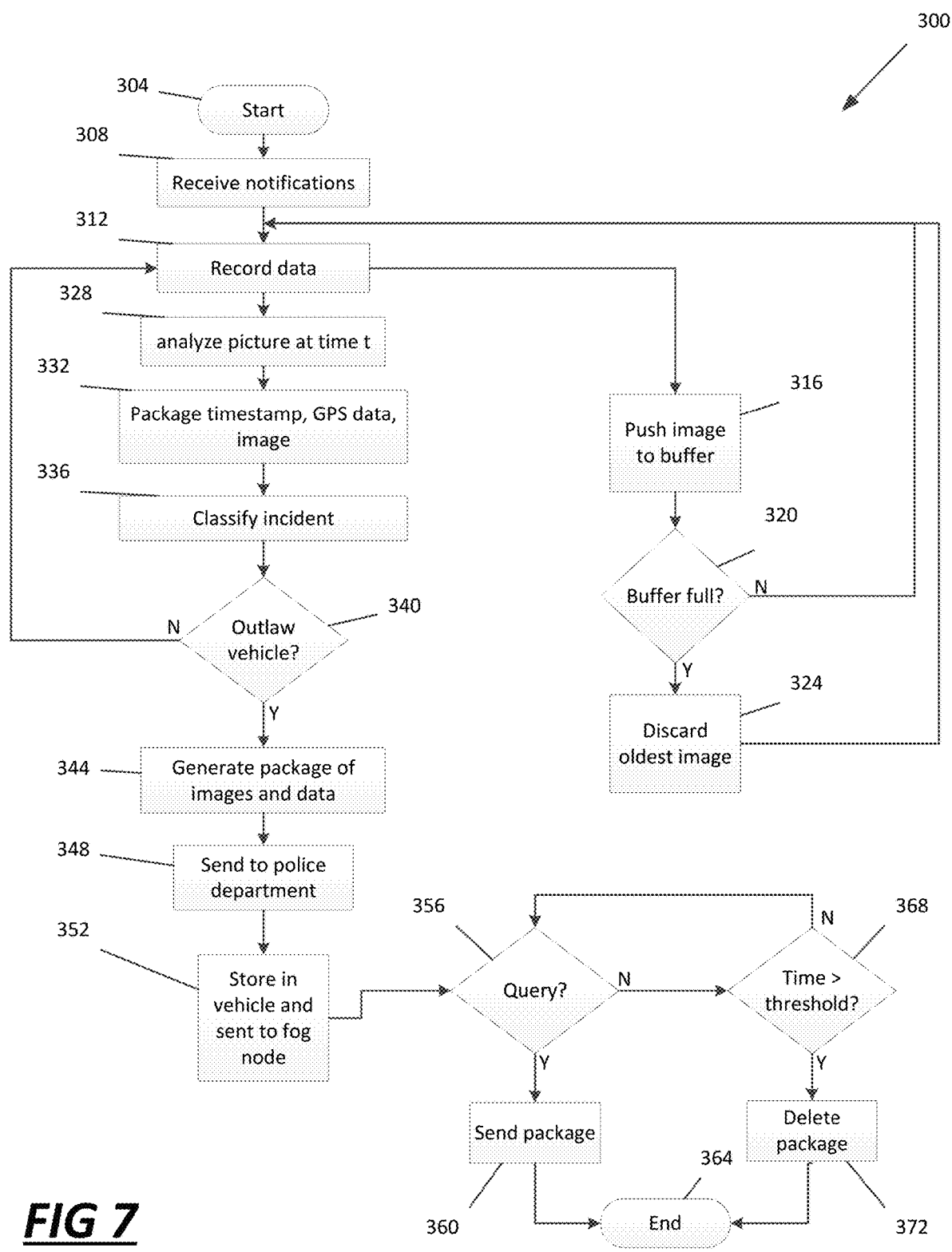
FIG. 7 is a flow chart illustrating an example method for outlaw vehicle detection reporting according to the present disclosure.

Now referring to FIG. 7, an example method 300 for outlaw vehicle detection reporting according to the present disclosure is illustrated. Method 300 begins at 304. At 308, notifications related to outlaw vehicles are received. For example, the notifications may include amber alerts, silver alerts, or other outlaw vehicle alerts sent by a government organization or the police. The contents of the notification may include license plate numbers, vehicle identification numbers (VIN), vehicle (make, model, color, type, number of doors, etc.) descriptions, person (name, sex, age, height, weight, race, hair color, identifying marks, etc.) descriptions, etc. For example, the police or other government organization may store databases of amber alerts, silver alerts, outlaw vehicle alerts, regional information, announcements from authorities, and other alerts in the cloud or remote server 60. The information may be sent to the system 12 (for example through wireless, Bluetooth, or other communications) from the cloud 60 through fog nodes or the local access point 68 and stored in the memory 62.

At 312, data of the surrounding area is recorded. For example, data is continuously recorded by the cameras 30, proximity/environmental sensors 20, and driver devices 56. The recorded data may include, but is not limited to, snapshots or images, videos, location information, timestamp information, weather metrics, etc.

The recorded data is pushed to a buffer at 312 for storage. For example, the image is pushed to the buffer for short-term local storage or caching. The host vehicle 10 may include the memory 62 or other electronic storage to temporarily store or cache the information (for example, snapshots or images, videos, location information, time information, weather metrics, etc.) for later distribution. For example only, the memory 62 may hold 32 GB of data which is split between stored footage defined as incident footage and data that is continuously recorded from the cameras 30, proximity sensors 20, and/or driver device 56.

At 320, the method 300 determines whether the buffer is full. For example, to be effective for its specific intended use, the memory 62 is of a limited size. As such, the memory 62 only has the capability to store a limited number of images and related data. For example, the memory 62 may have the capacity to store within a range of 1 gigabyte to 1 terabyte of data. The space allotted to the continuously stored information may change based on whether any incidents have been identified and whether any incident data packages have been stored for later distribution. For example only, the buffer may be full if 70% of the 32 GB is in use.

If the buffer is full, the oldest image is discarded at 324 to make space for new images. For example, the images may be ordered according to the timestamp associated with each image. Thus, when the buffer becomes full, the image having the oldest timestamp is discarded and replaced with the image and data taken in step 312. If the buffer is not full at 320, the method 300 returns to 312.

At 328, images taken at time interval t are evaluated. For example, while the cameras 30, proximity sensors 20, and/or driver devices 56 may be continuously recording images or video, the incident determination unit 40 may analyze image clips at specified time intervals. In some cases, time t may be every 6 seconds.

At 332, the timestamp, GPS data, and image for each of the images evaluated at time interval t is packaged. For example, for each of the images taken, a timestamp and GPS location is recorded along with the physical image. All of the data collected for each image may be packaged for analysis.

At 336, the incident is classified. For example, the incident determination unit 40 may analyze the data contents of the package from step 332 to determine an incident classification. As previously discussed, the incident may be one of a vehicle accident, an immobilized vehicle, a broken-down vehicle, a major pothole, large animal activity, an outlaw vehicle, a silver alert vehicle, an amber alert vehicle, a driver or other person in distress, significant damage to a road, and debris on the road. The incident determination unit 40 may determine the incident classification through image comparisons, facial recognition, body language identification, hand signal identification, government alerts, vehicle databases, etc.

At 340, the method 300 may determine whether the vehicle is an outlaw vehicle. An outlaw vehicle may be an amber alert vehicle, a silver alert vehicle, or another outlaw vehicle. For example, the incident determination unit 40 may determine the outlaw vehicle through image comparisons, facial recognition, government alerts, vehicle identifier databases, etc.

If not an outlaw vehicle, the method 300 returns to 312. If an outlaw vehicle at 340, the method 300 may generate a package including the images and data for distribution at 344. For example, the communication unit 48 may take multiple packages from step 332 that apply to the same incident classification (i.e., that apply to the identified outlaw vehicle) and format the contents and data for distribution.

At 348, the package is sent to the police department. As previously discussed, the package may be sent to the police department through the fog node(s) or the cloud.

At 352, the package is stored within the vehicle and sent to and stored within the fog node or local access point 68. The fog node or local access point may provide temporary storage or caching (until the data is sent to the cloud 60), or the fog node or local access point may provide long term (for example, months) storage of the local statistics (weather, large animal activity). The incident information data may be stored in the cloud 60 (for example, forever or until decided as not needed by a data retention policy). In addition to storage, the cloud 60, fog node, or local access point 68 may calculate trends and statistics from the stored data.

The incident information data may be stored within the memory 62 of the vehicle 10. The memory 62 may provide temporary storage or caching until the data can be sent to the fog node, local access point 68, or cloud 60. Additionally, the memory 62 may provide temporary storage until the data is requested by police or other services.

At 356, the method 300 determines whether there has been a query for the package. The query may come from a service provider (for example, insurance, police, etc.) or from one of the individuals involved in the incident.

If a query was received, the package is sent to the party initiating the query at 360. The method then ends at 364. If a query was not received at 356, the method 300 determines whether an elapsed time is greater than a threshold at 368. For example only, the elapsed time may equate to a document retention policy and may be equal to approximately 2 years.

If the time is not greater than the threshold, method 300 returns to 356. If the time is greater than the threshold at 368, the package is deleted from the cloud at 372. The method then ends at 364.

Figure 8:
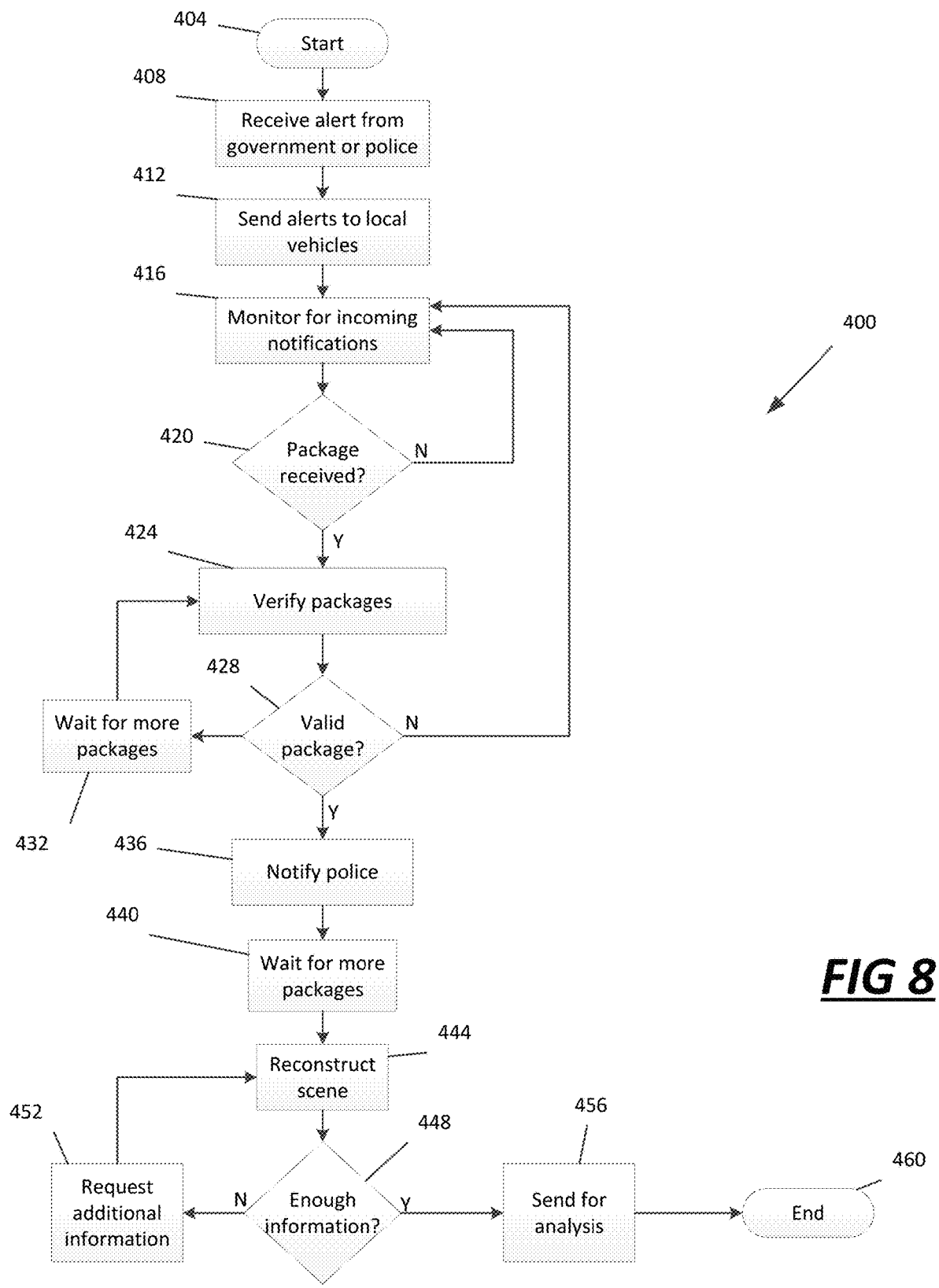
FIG. 8 is a flow chart illustrating an example method of receiving and reporting external incidents at a fog node or cloud according to the present disclosure.

Now referring to FIG. 8, an example method 400 of receiving and reporting external incidents at a fog node or cloud according to the present disclosure is illustrated. Method 400 starts at 404.

At 408, alerts are received from the government or police. For example, the government organization or police may upload or send feature information (for example only, car shape, make, model, year, color, license plate number, vehicle identification number, or other identifying characteristics) of the outlaw vehicle to the cloud 60.

At 412, the alerts are sent to local vehicles, mobile devices, or stationary devices 10'. For example, the fog nodes or local access points 68 located around the estimated location of the suspect, or outlaw, vehicle receive the data from the cloud 60 and distribute the data to local remote vehicles, mobile devices, or stationary devices 10'. For example only, if the estimated location of the suspect, or outlaw, vehicle is a 60 mile radius area, the fog nodes or local access points 68 within ten miles of the 60 mile radius area (i.e., a 70 mile radius area) may receive the data from the cloud 60. The vehicles may receive the information through wireless, Bluetooth, or other communications.

At 416, the cloud 60, or fog nodes, or local access points 68 monitor incoming data for notifications related to the outlaw vehicle. For example, data may be transferred to the cloud 60, fog nodes, or local access points 68 through wireless, Bluetooth, or other communications. The cloud 60, fog nodes, or local access points 68 may analyze the data upon reception to determine wither the data includes any notifications regarding the outlaw vehicle.

At 420, method 400 determines whether any package received. For example, as previously discussed in relation to steps 328 and 360 in method 300 (FIG. 7), the communication unit 48 in vehicle 10 may take multiple packages including timestamp, GPS data, and image data that apply to the same incident classification (i.e., that apply to the identified outlaw vehicle) and format the contents and data for distribution. The cloud 60, fog nodes, or local access points 68 may monitor the data networks to determine whether any packages have been sent from local vehicles 10. If no packages have been received, method 400 returns to 416.

If packages have been received at 420, the packages are verified at 424. For example, the cloud 60, fog nodes, or local access points 68 may analyze the data in each package upon reception to determine whether the data includes notifications regarding the outlaw vehicle. The cloud 60, fog nodes, or local access points 68 may also analyze the packages for authenticity. For example the analysis may include verifying the encrypted vehicle ID, checksum of the report data, use of a decentralized certificate management authority system, etc.

At 428, the method 400 determines whether the package is valid. For example, the cloud 60, fog nodes, or local access points 68 may analyze the data in each package to determine whether all necessary data (for example, timestamp, GPS data, and image data for each image) is present and whether all data is valid (for example, not corrupt). The cloud may validate the data by comparing and corroborating the findings in a plurality of incident reports from multiple sources and observing events consistent to the reported incident (e.g. broken down vehicle will cause traffic jams) or if the driver(s) reported or police already reported the event.

If the data is not valid, method 400 returns to 416. If it is not clear whether the data is valid at 428, method 400 waits for more packages at 432 and returns to 424. If the data is valid at 428, the police are notified at 436. For example only, the packages may be sent to the police department through the fog node(s) or the cloud to notify the police of the outlaw vehicle sighting.

At 440, method 400 waits for additional packages. As in 416 and 432, the cloud 60, or fog nodes, or local access points 68 monitor incoming packages containing data related to the outlaw vehicle. For example, data may be transferred to the cloud 60, fog nodes, or local access points 68 through wireless, Bluetooth, or other communications.

At 444, the scene is reconstructed from the data in all packages received from all local vehicles, mobile devices, or stationary devices 10, 10'. The cloud 60, or fog nodes, or local access points 68 may analyze and compile all packages received that relate to a single outlaw vehicle event to reconstruct as much of the timeframe surrounding the outlaw vehicle sighting as possible.

At 448, the method 400 determines whether there is enough information to reconstruct the scene. For example, the cloud 60, or fog nodes, or local access points 68 may analyze the data to determine whether there are any missing portions of data (for example, periods of time). If data is missing, additional information is requested at 452 by pinging or pushing data requests to local vehicles, mobile devices, or stationary devices 10'. Method 400 then returns to 444.

If there is enough information at 448, the scene reconstruction and packaged data is sent for analysis at 456. For example, the data may be sent to the police, government agency, or other service for analysis.

The method ends at 460.

Figure 9:
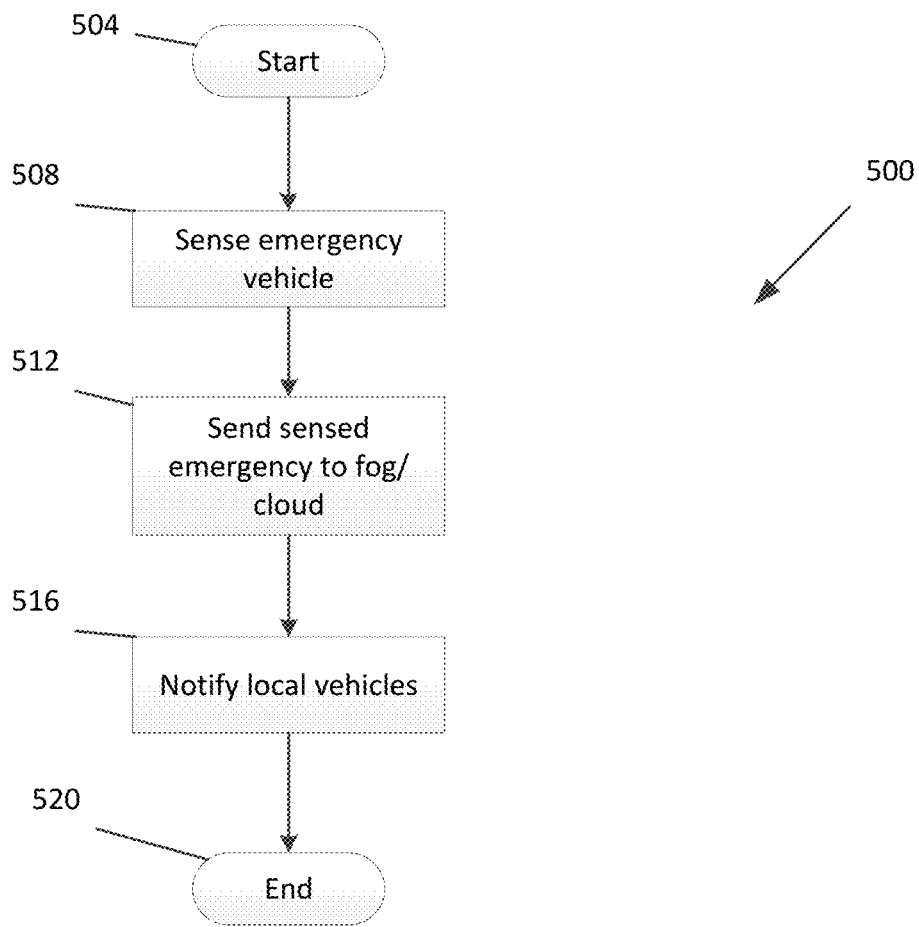
FIG. 9 is a flow chart illustrating an example method for real-time locating of an emergency vehicle according to the present disclosure.

Now referring to FIG. 9, an example method 500 for real-time locating of an emergency vehicle is illustrated. Method 500 starts at 504. At 508 vehicle 10 senses an emergency vehicle. For example, vehicle 10 may determine the presence of the emergency vehicle by sound, location, image, etc. Vehicle 10 further uses the sound, location, image, etc., data to determine the type of emergency (for example, accident, distress, etc.). Upon sensing the emergency vehicle, vehicle 10 may also yield to the emergency vehicle if necessary.

At 512, the sensed information is sent to the cloud 60, fog node, or local access point 68. For example, the collected sound, location, image, type of vehicle, type of emergency, etc., information may be sent by wireless, Bluetooth, or other communications to the cloud 60, fog node, or local access point 68.

At 516, local vehicles, mobile devices, or stationary devices 10' are notified of the emergency. The cloud 60, fog node, or local access point 68 may maintain and send out real-time updates to the location of the emergency vehicle. For example, the cloud 60, fog node, or local access point 68 may send updates to the location of the emergency or emergency vehicle to vehicles, mobile devices, or stationary devices 10' in a 20-mile radius of the emergency or emergency vehicle. Specifically, the cloud 60, fog node, or local access point 68 may send emergency vehicle location and instructions to local vehicle, mobile device, or stationary device 10' in front of the emergency vehicle so that they can prepare to yield to the emergency vehicle. Additionally, the cloud 60, fog node, or local access point 68 may send updates to the location of the emergency or emergency vehicle to mapping or navigation systems or services to update navigation maps to reflect the emergency, At 520, method 500 ends.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Spatial and functional relationships between elements (for example, between modules, circuit elements, semiconductor layers, units, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module," the term "unit," or the term "controller" may be replaced with the term "circuit." The term "module" or the term "unit" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module or unit may include one or more interface circuits. In some examples, the interface circuits may include wired or wireless interfaces that are connected to a local area network (LAN), the Internet, a wide area network (WAN), or combinations thereof. The functionality of any given module or unit of the present disclosure may be distributed among multiple modules or units that are connected via interface circuits. For example, multiple modules or units may allow load balancing. In a further example, a server (also known as remote, or cloud) module or unit may accomplish some functionality on behalf of a client module or unit.

The term code, as used above, may include software, firmware, and/or microcode, and may refer to programs, routines, functions, classes, data structures, and/or objects. The term shared processor circuit encompasses a single processor circuit that executes some or all code from multiple modules or units. The term group processor circuit encompasses a processor circuit that, in combination with additional processor circuits, executes some or all code from one or more modules or units. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules or units. The term group memory circuit encompasses a memory circuit that, in combination with additional memories, stores some or all code from one or more modules or units.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MAT-LAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An automatic external incident detection and reporting system for a vehicle, comprising:
    at least one of a plurality of cameras and a plurality of proximity sensors;
    an incident determination unit configured to receive signals from the at least one of the plurality of cameras and the plurality of proximity sensors, automatically detect whether an external incident has occurred, and automatically determine a type of external incident, the external incident being an incident external to the vehicle;
    a remote vehicle or object position determination unit configured to receive signals from the at least one of the plurality of cameras and the plurality of proximity sensors and automatically determine an external incident location; and
    a communication unit configured to automatically transmit at least the external incident location and the type of external incident to remote vehicles, to a local access point, or to automatically share the external incident location and the type of external incident through a crowd-sourcing manner if the external incident has occurred.

2. The system of claim 1, wherein the incident determination unit is configured to use facial recognition, hand signals, or body language to determine whether a remote driver is in distress.

3. The system of claim 1, wherein the incident determination unit is configured to analyze images from the plurality of cameras to determine whether there has been a remote traffic accident.

4. The system of claim 1, wherein the incident determination unit is configured to either compare images from the plurality of cameras with known images of large animals to determine whether there is large animal activity or use machine learning methods and models to automatically identify one or more animals.

5. The system of claim 1, wherein the incident determination unit is configured to either compare images from the plurality of cameras with known images of an acceptable roadway to determine whether there are potholes or debris on a roadway or use machine learning methods and models to automatically identify a road surface and any debris or damage to the road surface.

6. The system of claim 1, wherein the external incident is one of a remote vehicle accident, a remote immobilized vehicle, a remote broken-down vehicle, a pothole, large animal activity, a remote outlaw vehicle, a remote driver or other person in distress, significant damage to a road, debris, and one or more persons loitering, and the external incident involves only one or more vehicles, persons, or objects external to the vehicle.

7. The system of claim 1, further comprising a vehicle position determination unit configured to determine a current position of the vehicle.

8. The system of claim 1, further comprising a driver alert system configured to alert a driver of the vehicle when the external incident is detected by the incident determination unit.

9. The system of claim 1, wherein the communication unit is configured to automatically transmit the external incident location and type of external incident to a data transmission system on the vehicle, and the data transmission system automatically communicates the external incident location and type of external incident to a remote server.

10. The system of claim 1, wherein the communication unit is configured to automatically transmit the external incident location and type of external incident to an emergency services provider.

11. A method for automatically detecting and reporting external incidents, comprising:
    receiving, by an incident determination unit and a remote vehicle or object position determination unit, a plurality of signals from at least one of a plurality of cameras and a plurality of proximity sensors disposed on a vehicle;
    automatically detecting, by the incident determination unit, whether an external incident has occurred;
    automatically determining, by the incident determination unit, a type of external incident;
    automatically determining, by the remote vehicle or object position determination unit, an external incident location; and
    automatically transmitting, by a communication unit, at least the external incident location and the type of external incident to remote vehicles or a local access point, or automatically sharing, by the communication unit, the external incident location and the type of external incident through a crowd-sourcing manner if the external incident has occurred.

12. The method of claim 11, further comprising performing, by the incident determination unit, facial recognition, hand-signal recognition, or body language recognition to determine whether a remote driver is in distress.

13. The method of claim 11, further comprising analyzing, by the incident determination unit, images from the plurality of cameras to determine whether there has been a remote traffic accident.

14. The method of claim 11, further comprising either comparing, by the incident determination unit, images from the plurality of cameras with known images of large animals to determine whether there is large animal activity, or employing, by the incident determination unit, detection algorithms to determine whether there is large animal activity.

15. The method of claim 11, further comprising either comparing, by the incident determination unit, images from the plurality of cameras with known images of an acceptable roadway to determine whether there are potholes or debris on the roadway, or employing, by the incident determination unit, scene analysis algorithms to detect potholes or debris.

16. The method of claim 11, wherein the external incident is one of a remote vehicle accident, a remote immobilized vehicle, a remote broken-down vehicle, a major pothole, large animal activity, a remote outlaw vehicle, a remote driver or other person in distress, significant damage to a road, and debris on the road, and the external incident involves only one or more vehicles, persons, or objects external to the vehicle.

17. The method of claim 11, further comprising determining, by a vehicle position determination unit, a current position of the vehicle.

18. The method of claim 11, further comprising alerting, by a driver alert system, a driver of the vehicle when the external incident is detected by the incident determination unit.

19. The method of claim 11, further comprising automatically transmitting, by the communication unit, the external incident location and type of external incident to a data transmission system on the vehicle, and automatically communicating, by the data transmission system, the external incident location and type of external incident to a remote server.

20. The method of claim 11, further comprising automatically transmitting, by the communication unit, the external incident location and type of external incident to an emergency services provider.

* * * * *